Figure 1:
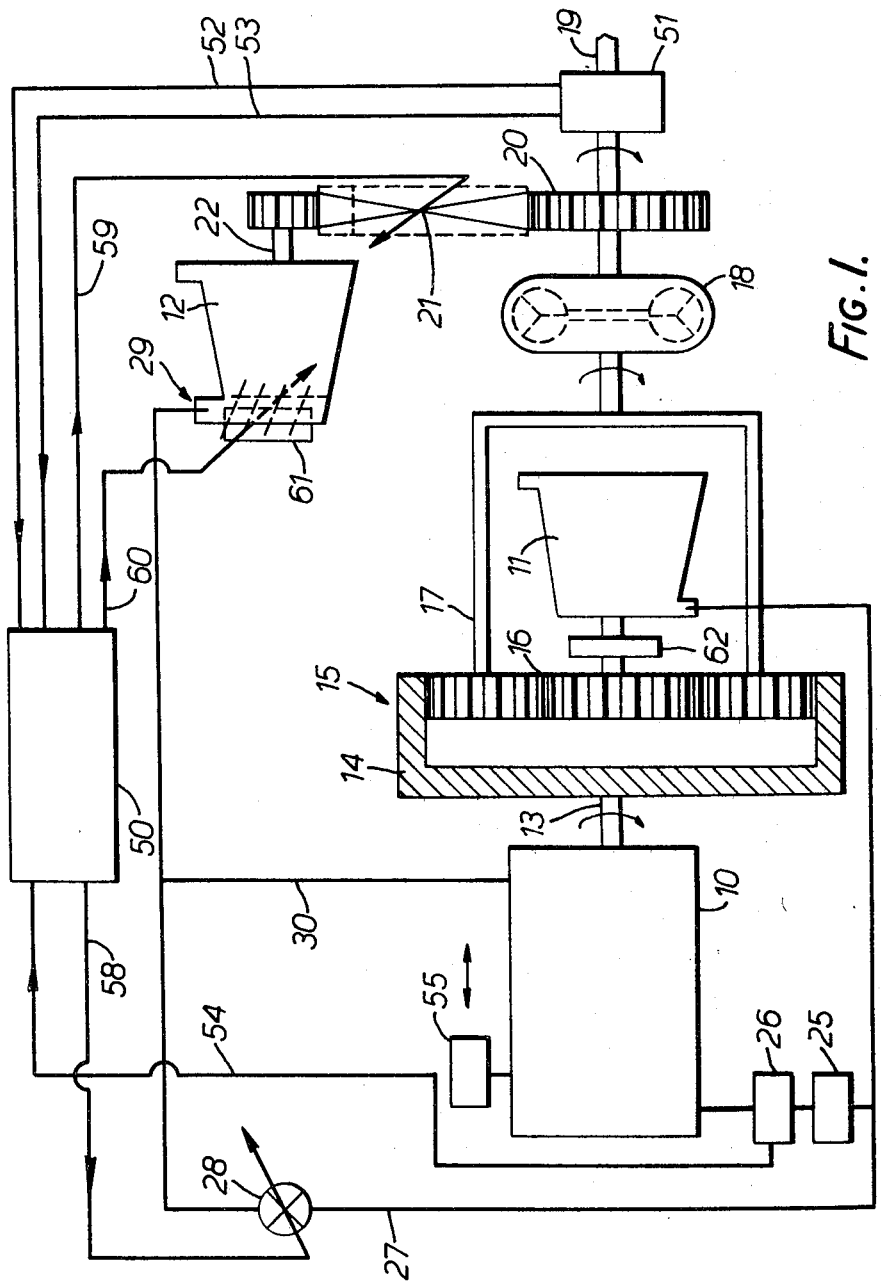

United States Patent [19]

Wallace

[11] 4,452,043
[45] Jun. 5, 1984

[54] DIFFERENTIAL COMPOUND ENGINE

[75] Inventor: Frank J. Wallace, Bath, England

[73] Assignee: South Western Industrial Research Limited, Bath, England

[21] Appl. No.: 285,568

[22] Filed: Jul. 21, 1981

[30] Foreign Application Priority Data

Jul. 22, 1980 [GB] United Kingdom ............... 8023962

[51] Int. Cl.³ .......................................... F02B 37/00
[52] U.S. Cl. ...................... 60/600; 60/606; 60/624
[58] Field of Search ............. 60/600, 601, 602, 603, 60/624, 606, 607, 608

[56] References Cited

U.S. PATENT DOCUMENTS

| | | | |
|---|---|---|---|
| 2,565,080 | 8/1951 | Lieberherr | 60/600 |
| 2,585,968 | 2/1952 | Schneider | 60/624 |
| 2,880,571 | 4/1959 | Glamann | 60/624 |
| 3,007,302 | 11/1961 | Vincent | 60/624 |
| 3,090,194 | 5/1963 | Glamann | 60/624 |
| 3,238,713 | 3/1966 | Wallace | 60/624 |
| 3,570,240 | 3/1971 | Melchior | 60/606 |
| 3,673,797 | 7/1972 | Wilkinson | 60/600 |

*Primary Examiner*—Douglas Hart
*Attorney, Agent, or Firm*—Young & Thompson

[57] ABSTRACT

A compound traction engine for a heavy vehicle including a high temperature adiabatic four stroke reciprocating diesel engine arranged to drive a boost compressor through a differential gear. The other output of the gear is connected through a torque converter to the output shaft. The exhaust from the engine is fed to a turbine with an adjustable blade nozzle ring and the output from the compressor is connected to the air inlet of the engine and is also connected via a valve to the same turbine. The turbine is connected via a continuously variable transmission to the output shaft. An automatic control unit has inputs from an output torque/speed sensor and a boost pressure sensor and is arranged to control the variable gear and the turbine blade ring.

9 Claims, 4 Drawing Figures

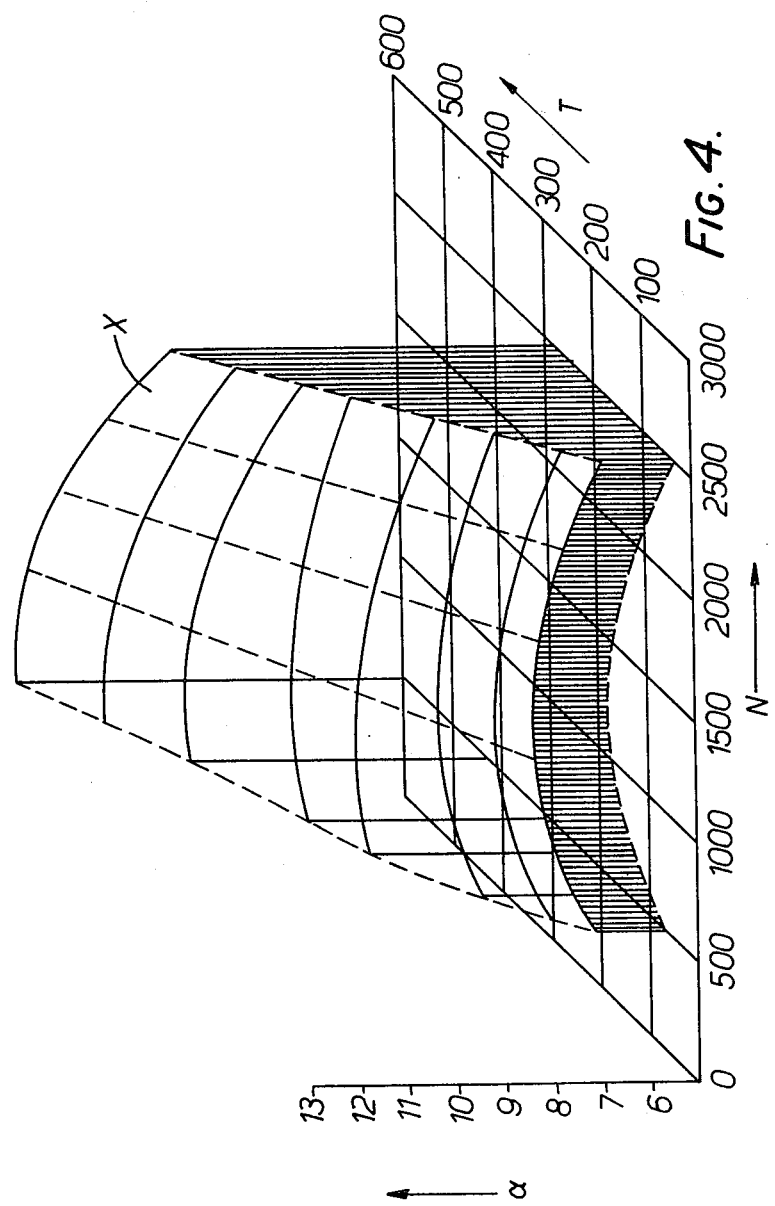

DIFFERENTIAL COMPOUND ENGINE

This invention relates to a power plant including a reciprocating internal combustion engine, a supercharging compressor and an exhaust turbine, so coupled together that the exhaust from the engine drives the turbine which is in turn arranged to drive the output shaft, at least some of the components being additionally linked mechanically. The invention is particularly applicable to a so-called differential compound engine in which the output shaft of the reciprocating engine is connected to the input of a differential gear having two outputs, one of which is coupled to the compressor and the other to the turbine and to an output shaft. Power plants of this type will be referred to for convenience as differential compound engines.

Such compound engines offer the possibility or potential of very useful results and advantages. They are potentially reliable, economical in operation and of relatively low cost. The power output in relation to weight and size is favourable and the torque characteristics are particularly attractive especially in view of the continuous torque increase which can be achieved down to output shaft stall. Thus, the compound engines offers excellent characteristics for use as a traction engine or in general for heavy transport applications such as heavy goods vehicles or off-highway vehicles. The fact that heavy torque can be generated at zero output shaft speed avoids the need for any form of change speed gearbox in the mechanical output from the engine, a great advantage in cost and operating simplicity.

In the design of such a compound engine a number of problems arise including the generation of surplus air from the compressor, particularly near output stall conditions. It has been proposed to add an auxiliary "stall turbine" which will accept surplus compressor air under specific conditions, the stall turbine being specially designed to generate high torque when stalled or at very low speed. With the stall turbine mechanically linked to the output shaft this provides additional torque, for example when a vehicle is accelerating from rest.

Existing proposals, however, all suffer from certain limitations and disadvantages. For example, it is found that a two stroke i.e. engine may suffer from severe thermal overloading with consequent problems such as piston failure. Also, the output torque/speed characteristic curve is liable to be discontinuous at the changeover point where the stall turbine is brought into operation. It is also difficult to establish maximum efficiency in the turbines and the compressor when operating over the whole range of conditions and the design suffers from excessive quantities of circulating air from the compressor.

It is an object of the present invention accordingly to provide an improved compound engine which will at least partly overcome some of the existing problems and will provide a more efficient and attractive power plant considered overall.

Broadly stated the invention consists in a compound power unit, comprising a reciprocating internal combustion engine, an exhaust turbine driven by the exhaust gases from the engine, a supercharging compressor supplying air under pressure to the air intake of the engine, and a differential transmission having its input connected to the engine crankshaft, one output connected to the compressor shaft, and the other output connected to the main output shaft of the power unit, and also coupled to the turbine shaft, the arrangement being such that substantial torque can be applied to the output shaft without overspeeding of the compressor at or near stall conditions and throughout the operating range.

According to a preferred feature of the invention the power unit includes a torque converter interposed between the second output of the differential transmission and the final output shaft. This has many potential advantages and, in particular, it is a very efficient means of increasing stall torque when the speed of the output shaft is stationary or nearly so, and it also greatly reduces the tendency of the compressor to overspeed near the stall point, which would produce large quantities of wasteful excess air. According to a particular preferred feature of the invention the torque converter is positioned between the differential transmission and the connection between the exhaust turbine and the output shaft. This allows the torque converter to be of relatively small size and power since it does not have to handle the power transmitted from the turbine to the output shaft. Alternatively, if the torque converter is positioned between the continuously variable gear for the exhaust turbine, and the final output shaft, even higher stall torque ratios can be obtained; however, in this case the torque converter will have to handle the full output torque and will therefore be larger.

According to another preferred and important feature of the invention the power unit includes means for providing a continuously variable transmission ratio between the exhaust turbine and the output shaft. The exhaust turbine is also preferably provided with nozzle blade angle and adjusting mechanism.

In any case the output of the compressor is preferably connected both to the engine intake and to the intake of the turbine. In such case the apparatus preferably includes a bypass valve controlling the flow of pressure air from the compressor to the turbine.

According to another particular preferred feature of the invention the engine is of 4-stroke semi-adiabatic design.

It is also particularly preferred that the compressor should be of the positive displacement screw-type.

Rather then design the power unit for operation under particular speed and torque conditions, a desirable feature of the invention is its ability to operate efficiently over the whole torque/speed range. Thus, according to another preferred feature the unit includes an automatic controller having inputs representing output shaft torque and speed, and outputs to the adjusting mechanisms for the continuously variable transmission and for the turbine nozzle blade angle. The controller may also have an input from a boost pressure senser, and an additional output to a bypass valve controlling the flow of surplus compressor air to the turbine.

Figure 2:
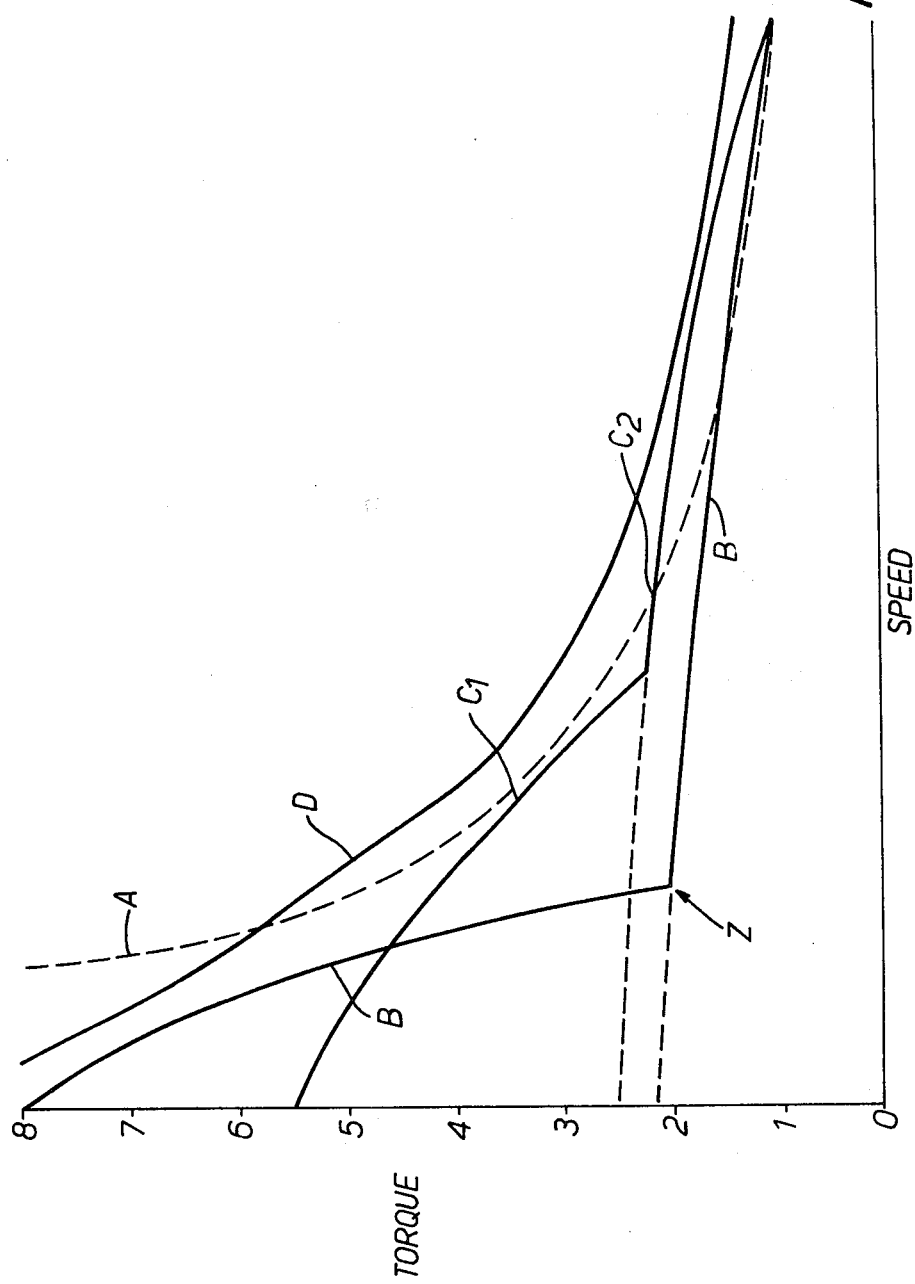
Figure 3:
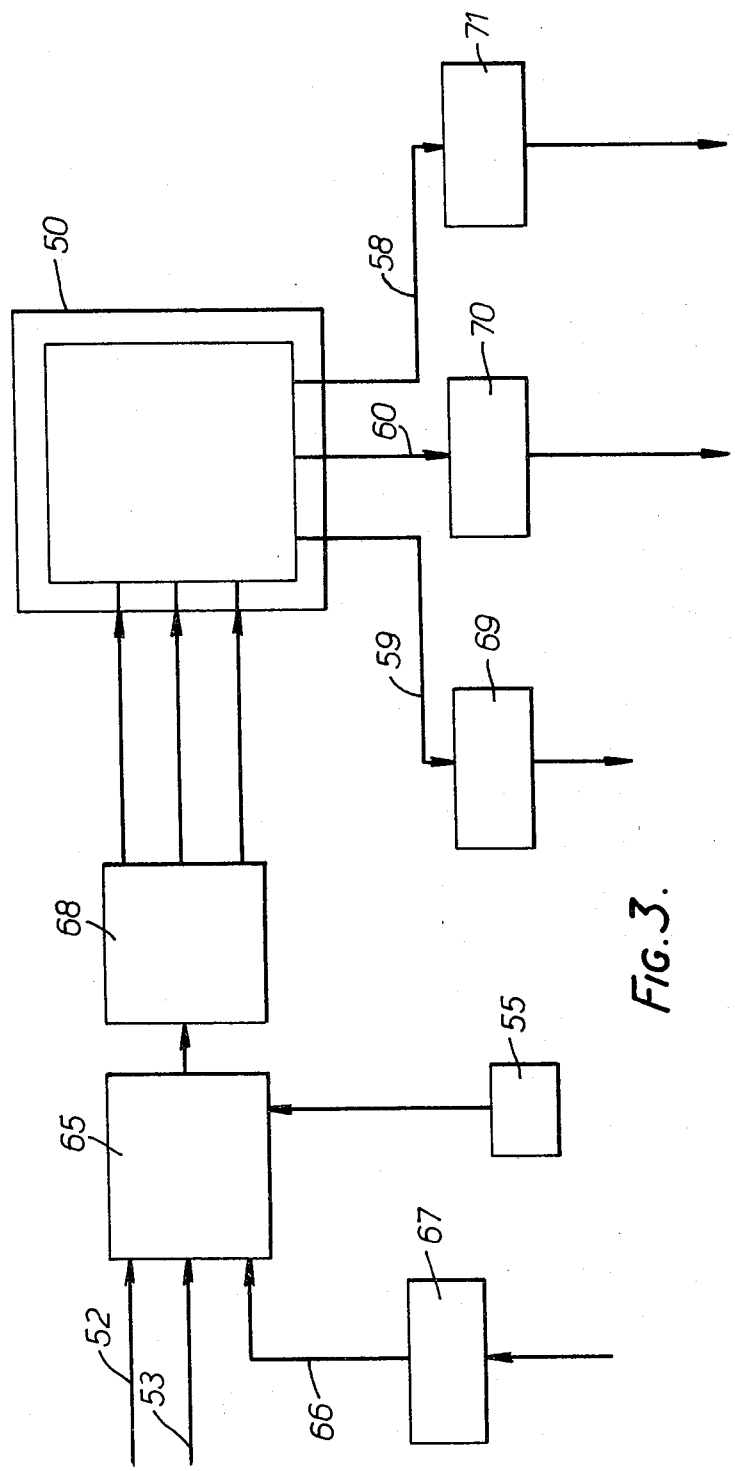

The invention may be performed in various ways and one specific embodiment with a number of possible modifications will now be described by way of example with reference to the accompanying drawings, in which:

FIG. 1 is a diagrammatic layout of one form of compound engine power plant according to the invention, FIG. 2 is a torque speed characteristic curve illustrating the performance of such a power plant, FIG. 3 is a block diagram of one example of an automatic control system for the power plant, and FIG. 4 is an illustration representing a three dimensional control envelope.

The power plant illustrated in FIG. 1 consists basically of a reciprocating diesel engine 10, a rotary compressor 11, and a power turbine 12. The output shaft 13 from the engine is connected to the input annulus 14 of an epicyclic differential gear unit 15. The sun pinion 16 is connected to the compressor 11 and the planet carrier 17 is connected through a torque converter 18 to a final mechanical output shaft 19. The shaft 19 is also connected via a gear 20 and a continuously variable transmission (CVT) 21 to the shaft 22 of the turbine 12.

Air under pressure from the compressor 11 is led via a cooler 25 and a boost pressure sensor 26 to the air intake of the engine 10. The compressor outlet also includes a branch 27 which leads via a bypass valve 28 to the input 29 of the turbine 12. The exhaust outlet 30 of the engine 10 is also connected to this input 29 of the turbine.

An automatic control system for the power plant, shown in more detail in FIG. 3, includes a microprocessor 50 having in this example 3 controlling input signals. A sensor 51 on the output shaft 19 provides instantaneous signals on lines 52 and 53 representing output torque and output speed, respectively. Another line 54 connected to the boost sensor 26 provides an indication of the supercharging pressure. The engine 10 is basically controlled by an adjusting device on a fuel pump 55 and there may also be a further input to the control providing an indication of the fuel pump setting. In this example there are three outputs from the control system. One output line 58 is connected to the bypass valve 28, a second output 59 is connected to the continuously variable transmission 21 to adjust the ratio, and a third output 60 is connected to a variable nozzle or blade angle device illustrated diagrammatically at 61 at the inlet to the turbine 12.

The reciprocating engine 10 is particularly designed and selected to be a four stroke semi-adiabatic engine. Such engines are well-known in themselves, but they have particular advantages and benefits in this compound power plant. By selecting a four stroke engine instead of a two stroke as previously, the positive displacement characteristics of the four stroke engine provides an automatic control on the quantity of air admitted to the engine and likewise the quantity of exhaust. Since the compressor 11 is providing some surplus air under all conditions, it is found in practice that the bypass valve 28 may be left permanently open and indeed the output 58 from the controller may be omitted. The semi-adiabatic nature of the engine greatly increases the exhaust gas temperature with consequent increase in turbine power and torque and a resultant rise in overall efficiency.

The compressor 11 is of a rotary positive displacement design in preference to, for example, a centrifugal or reaction bladed design. A screw type compressor such as a Lysholm, Rootes, or SRM may be used. Such compressors have good efficiency and high outputs over a wide range of speeds, and furthermore they are able to produce substantially the full designed pressure range even at very low compressor speeds. In a differential compound engine this is a further advantage since such low speeds of the compressor correspond to very high output shaft speeds.

In certain applications it may also be of advantage to allow the compressor to be decoupled from the differential gear and for this purpose a clutch may be included in the compressor drive shaft as indicated at 62.

The torque converter 18 is a high efficiency high torque ratio unit. One of the advantages is that it greatly reduces the tendency of the compressor to over-speed near the stall point, producing large quantities of thermodynamically wasteful excess air. Also, the torque converter is a more efficient means of increasing the stall torque than for example providing an additional stall turbine. Also, it will be noticed in this example that the torque converter is positioned between the differential gear and the gear 20 which couples the turbine to the output shaft. Therefore, the torque converter is not required to handle the full output of the engine but only the difference between the engine power and the compressr power, the turbine output power being connected to the output shaft downstream of the torque converter. The torque converter can therefore be of smaller size and weight. In some applications, however, it may be preferred to locate the torque converter in the output shaft downstream of the gear 20 to which the turbine is coupled. In this case the torque converter will have to handle the full output power, but it will enable the turbine to run at low speeds even when the output shaft is completely stalled.

The continuously variable transmission 21 is a very great improvement over, for example, a fixed ratio drive between the output shaft and the turbine shaft. The CVT allows the turbine to operate throughout the entire load speed field at near optimum efficiency, and greatly to improve:
a. its own torque contribution to output shaft torque, and
b. the overall efficiency of the unit as a whole, in addition to providing a "soft" coupling between the turbine and output shaft, i.e. some ability to absorb speed variations.

The turbine 12 may be of various types, but one preferred design is a radial inflow turbine fitted with a variable geometry nozzle ring. Such turbines are well known and do not require detailed description.

The micro-processor controller 50 is illustrated with its associated inputs and outputs in FIG. 3. The two input lines 52,53 from the output shaft torque and speed sensor 51 are fed to a multiplexer unit 65 which may also have a third input 66 from a frequency convertor 67 which provides a signal related to boost pressure as sensed at 26. There may be a fourth input derived from the instantaneous setting of the fuel control 55. The multiplexer as known provides instantaneous pulsed outputs which are fed to an analog-digital convertor 68 and thence on three output lines to the actual microprocessor 50. This includes a program containing an empirical equation for the optimum output torque and error analysis to control the turbine nozzle blade angle, the ratio of transmission 21, and the bypass valve setting is preprogrammed to produce output signals which will hold the operating characteristics for example on an optimum surface "envelope," as illustrated at X in FIG. 4. This three-dimensional envelope X combines the turbine blade angle X, with the output torque T, and the output shaft speed N. The micro-processor has one output 59 leading via a digital/analog convertor 69 to the CVT unit 21, a second output 60 leading via another D/A convertor 70 to the turbine nozzle blade ring adjustor 61, and a third output 58 via D/A convertor 71 to the bypass valve 28.

Referring now to the output shaft torque/speed curves shown in FIG. 2, curve A is the "ideal" hyperbolic torque/speed envelope aimed at for all traction prime movers, and sometimes approximated to in conventional arrangements by use of multi-speed gearboxes with up to 16 ratios. Curve B illustrates the performance of a prior art differetial compound engine fitted with an auxiliary stall turbine as described above, and showing the marked torque discontinuity at the point Z where the stall turbine becomes operative. This also illustrates the considerable disparity from the ideal curve. Curve C illustrates how the torque envelope may be improved using a two-speed gearbox ($C_1$ represents bottom gear and $C_2$ top gear), but it will be seen that this still has a considerable disparity from the ideal curve, and a sharp discontinuity.

Curve D illustrates the torque envelope which may be obtained by means of the present invention incorporating the torque converter and the infinitely variable transmission in the turbine drive. One result is that the rated torque is raised even higher, as a result of adopting the semi-adiabatic principle, and moreover the torque rise is steeper and more continuous as a result of the CVT power turbine drive and the use of the torque convertor over the lowest one third of the output shafts speed range.

It will be seen that with this torque characteristic no change speed gearbox is required and the system will operate throughout the load speed range as a self-optimising continuously variable engine transmission unit.

The micro-processor control system responds to perceived demand for output shaft speed by the driver at the fuel control 55, acting in the first instance on the electronically governed engine fuel pump. The microprocessor, with stored numerical arrays corresponding to the optimum control envelopes of FIG. 4, continuously adjusts the turbine nozzle blade angle, the engine bypass valve setting, and the power turbine CVT speed ratio, to give best efficiency under steady operating conditions, and most rapid transient response during acceleration. A further advantage of the invention is that by adopting different control schedules for boost, bypass valve setting and power turbine CVT speed ratio, the unit can be adapted to meet a wide range of applications, e.g. in trucks, buses or earth moving appliances without changing the basic components, i.e. the engine, compressor or turbine.

Yet a further advantage is the outstanding transient response of the unit in view of the differential geared connection between the engine and super charging compressor, and the ability of the latter to accelerate virtually instantaneously when increased power is demanded. This is in marked contrast to the turbo-charged engine with its well-known turbo-charger lag and the associated tendency for black smoke emission during rapid acceleration.

In this particular example, with the desired combination of semi-adiabatic engine and compressor, the exhaust temperature is expected to lie in the range 500°–750° C., the effect of semi-adiabatic operation in raising the temperature being partly cancelled by dilution of engine exhaust with bypass air before it enters the turbine.

I claim:

1. A compound power unit, comprising a reciprocating internal combustion engine, a main output shaft, an exhaust turbine driven by the exhaust gases from said engine, said turbine including adjustable inlet nozzles and mechanism for adjusting the angle thereof, a supercharging compressor supplying air under pressure to the air intake of said engine, and a differential transmission having an input and two outputs, the input being connected to the crankshaft of said engine, one output connected to the shaft of said compressor, and the other output connected to said main output shaft, and also coupled to the shaft of said turbine, and including a continuously variable transmission between the exhaust turbine and said main output shaft, whereby substantial torque can be produced at said output shaft without overspeeding of said compressor throughout the operating range.

2. A compound power unit according to claim 1, including a torque converter interposed between said second output of the differential transmission and said main output shaft.

3. A compound power unit according to claim 1, in which said torque converter is operatively connected between said second output of the differential transmission, and the transmission connected between said exhaust turbine and said main output shaft.

4. A compound power unit according to claim 1, in which the air outlet output of said compressor is connected both to said engine intake and to the intake of said turbine.

5. A compound power unit according to claim 4, including a bypass valve controlling the flow of pressure air from said compressor to said turbine.

6. A compound power unit according to claim 1, in which said engine is of 4-stroke semi-adiabatic design.

7. A compound power unit according to claim 1, in which the compressor is of the positive displacement screw type.

8. A compound power unit according to claim 1, including an automatic controller having inputs representing the torque and speed of said main output shaft, and outputs to the adjusting mechanisms for said continuously variable transmission and for the mechanism adjusting said turbine nozzle blade angle.

9. A compound power unit according to claim 8, in which said controller also has an input from a boost pressure senser, and an additional output to a bypass valve controlling the flow of surplus compressor air from said compressor to said turbine.

* * * * *